(12) United States Patent
Taylor

(10) Patent No.: US 6,237,457 B1
(45) Date of Patent: May 29, 2001

(54) APPARATUS FOR PRECISELY GUIDING A WORKPIECE RELATIVE TO A WORK SURFACE

(75) Inventor: Christopher L. Taylor, Dallas, TX (US)

(73) Assignee: Taylor Design Group, Inc., Dallas, TX (US)

( * ) Notice: Subject to any disclaimer, the term of this patent is extended or adjusted under 35 U.S.C. 154(b) by 0 days.

(21) Appl. No.: 09/496,397

(22) Filed: Feb. 2, 2000

(51) Int. Cl.[7] .................................................. B23D 47/02
(52) U.S. Cl. .................. 83/435.15; 83/477.2; 83/435.11; 411/544
(58) Field of Search .............................. 83/437.1, 437.2, 83/435.11, 435.12, 435.14, 435.15, 477.2, 468.3, 581; 269/99, 305; 403/DIG. 7, 344; 411/913, 544, 156

(56) References Cited

U.S. PATENT DOCUMENTS

| | | | |
|---|---|---|---|
| 503,726 | * | 8/1893 | Pryibil .............................. 83/435.15 |
| 4,347,024 | * | 8/1982 | Coldren .............................. 411/156 |
| 5,038,486 | * | 8/1991 | Ducate, Sr. ....................... 83/435.14 |
| 5,097,601 | * | 3/1992 | Pollak .............................. 83/435.14 |
| 5,275,074 | | 1/1994 | Taylor . |
| 5,379,669 | * | 1/1995 | Roedig .............................. 83/477.2 |
| 5,402,581 | * | 4/1995 | Hurd et al. ......................... 83/435.12 |
| 5,496,142 | * | 3/1996 | Fodor et al. ......................... 411/544 |
| 5,617,909 | | 4/1997 | Duginske . |
| 5,735,054 | * | 4/1998 | Cole .................................. 83/435.11 |
| 5,979,283 | * | 11/1999 | Osborne ............................. 83/435.14 |

OTHER PUBLICATIONS

Taylor Design Group, Inc., *Owner's Manual for Incra Miter Slider*, 1991.

\* cited by examiner

*Primary Examiner*—Rinaldi I. Rada
*Assistant Examiner*—Thomas J. Druan, Jr.
(74) *Attorney, Agent, or Firm*—Richard L. Wynn, Jr.

(57) ABSTRACT

The present invention provides an apparatus used with materials fabrication power tools to reduce errors associated with loose-fitting materials fabrication guides. The present invention provides a materials fabrication surface having a slot and a guide variably positionable within the slot and capable of mounting a fixture such as a miter gauge. The guide includes an expandable member coupled to the guide member such that, upon expanding, the distance between the guide and the walls of the slot can be reduced. By reducing the distance between the guide member and the slot walls, inaccuracies associated with the guide member-to-slot interface are eliminated. In this manner, a fixture, such as a miter gauge, can be mounted and used on the guide and used with the power tool to increase accuracy and repeatability associated with the materials fabrication operations.

10 Claims, 2 Drawing Sheets

TOP VIEW

SIDE VIEW

APPARATUS FOR PRECISELY GUIDING A WORKPIECE RELATIVE TO A WORK SURFACE

FIELD OF THE INVENTION

The present invention relates generally to materials fabrication fixtures and more particularly to guides for providing precise positioning of mountable materials fabrication fixtures.

BACKGROUND OF THE INVENTION

As is well-known in the art, certain materials fabrication tools require precision guiding of work pieces thereon to produce desired geometries, tolerances, and configurations. Thus, conventional materials fabrication equipment such as table saws, router tables, band saws, and the like have included at or on guiding surfaces one or more longitudinally disposed slots adapted for mated fitting with guide members that may be guided rectilinearly. The geometries of the guide members must be closely correlated with the dimensions of the slots so as to avoid binding, wobble, or other tracking errors. The dimensions of such slots often conform to industry-wide standards, albeit within a broad range of tolerances. However, dimensional variation within this tolerance range from manufacturer to manufacturer, and from machine to machine often result in a poor fit between a particular guide member and a given slot, thus producing unacceptable occurrences of the aforementioned tracking errors.

To overcome the foregoing problems, there have previously been proposed a variety of configurations including the formation of the guide member in an extended longitudinal geometry that fits within the guiding slots. Due to the aforementioned variations in slot dimensions, however, it was typically necessary to machine the guide member to exacting tolerances to produce a customized fit between the guide member and a particular guide slot and reduce tracking errors. In addition to being relatively expensive to manufacture, such a custom guide member would also become one of a kind, and could not be readily transferred to another machine whose guide slots differed in geometry from those to which it had previously been fitted.

Christopher L. Taylor presented one solution to the aforementioned problem in U.S. Pat. No. 5,275,074. Taylor's '074 patent describes a slider bar constructed from a generally U-shaped channel, whose two legs are sloped like a truncated wedge. Sections of the sides of the slider bar in the '074 patent are separated from the main body to permit them to spring outwardly under pressure from wedging members that are removably connected to the channel using conventional machine screws.

U.S. Pat. No. 5,617,909 issued to Duginske describes another method for obtaining a secure sliding fit between a guide member and a slot. The '909 patent describes a hole bored through the sides of the guide member, which hole is threaded on one side of the member. A bearing is inserted into the unthreaded side of the hole, while a set screw is threaded into the threaded side of the hole. When used on a particular slot of a machine, the set screw is manually adjusted so that the set screw pushes a portion of the bearing out of the hole where it is maintained in abutting relationship with the side of the slot. One obvious limitation in the '909 design is that because the set screw is threaded into the side of the member, it cannot be adjusted with the member in place within the slot. Another limitation of the '909 design is increased fabrication costs due to the need for a separate manufacturing operation required to turn the guide member on its side to machine the aforementioned hole through the sides of the guide member.

Despite successful operation of the slider described in Taylor's '074 patent, a more rigid but equally as effective guide member is required for many operations. The slider in the '074 patent is preferably constructed of extruded aluminum because that material provides the most cost-effective system. While more rigid materials than aluminum could be used for the '074 patent's slider, such a product would be considerably more expensive due to manufacturing and machining costs. Another limitation of the '704 design relates to the need to separate sections of the sides of the guide member from the main body. This not only increases fabrication costs, but also weakens the guide member at the points where the sidewall separations occur.

While both the '704 and '909 designs provide means for adjusting the width of the guide member to conform to the variable widths of different guide slots, they are only partially effective in overcoming alignment errors associated with deviations from perfection in either the straightness or the width geometries of the guide members themselves.

In view of the foregoing, it is apparent that there has continued to be a need for an improved positionable guide member that can operate with a high degree of alignment accuracy over a wide range of guide slot geometries and that can be cost-effectively constructed from a wide variety of materials to provide strength and rigidity necessary for materials fabrication and other operations. Additionally, the need continues for such a guide member that also embodies simplicity of operation, that does not encroach upon equipment working surfaces, and that allows for adjustment to the geometry of a particular guide slot while the guide member is positioned within the slot. There also continues to be a need for a guide member that provides a high degree of alignment accuracy even when the straightness and width geometries of the guide member itself are less than perfect.

SUMMARY OF THE INVENTION

The present invention seeks to resolve the above and other problems with the prior art. More particularly, the invention is an advancement in the art by providing a precision guide positioning apparatus achieving the objects listed below:

One object of the present invention is to provide an apparatus for reducing inaccuracies associated with current state of the art of materials fabrication fixtures and assemblies.

Another object of the present invention is to provide a variable width guide apparatus usable with various guide slots having different guide slot widths.

Likewise, a further object of the present invention is to provide an easily accessible and usable guide apparatus for mounting and using fixtures associated with materials fabrication.

It is a further object of the present invention to provide a guide member that reduces tracking errors associated with moving the guide member along a slot within a materials fabrication surface.

It is another object of the present invention to provide a guide member with a high degree of alignment accuracy and configured to reduce contact friction associated with the guide member-to-slot interface.

It is a further object of the present invention to provide a guide member that delivers a high degree of alignment accuracy even when the straightness and width geometries of the guide member itself are less than perfect.

To accomplish the foregoing objects, in one form, the present invention provides a guide apparatus usable with a working surface having a slot for receiving the apparatus comprising an elongated member having an upper surface, a lower surface and two side surfaces, the elongated member being positionable within the slot. The guide apparatus further comprises at least one positioning element coupled to the elongated member, the positioning element comprising a shapeable material and an adjustment mechanism, wherein the adjustment mechanism is operably coupled to the shapeable material to alter the distance between the slot and the positioning element.

In another form, the present invention provides a guide apparatus usable with a working surface having a slot, the guide apparatus comprising an elongated member having an upper surface, a lower surface, and two side surfaces. The guide apparatus further comprising at least one positioning element coupled to the elongated member, the at least one positioning element comprising a shapeable material extending beyond one of the side surfaces.

In a still further form, the present invention provides a materials fabrication table comprising an upper working surface having at least one slot, a materials fabrication apparatus coupled to the upper working surface, a guide member comprising an elongated member having an upper surface, a lower surface and two side surfaces, the guide element positionable within the slot. The materials fabrication table further comprising an adjustment mechanism coupled to the guide member, the adjustment mechanism configured to alter a distance between the slot and the guide member.

These and other features of the invention will be more clearly understood and appreciated upon considering the detailed embodiments described hereinafter.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The conceptual groundwork for the present invention involves providing a materials fabrication apparatus for reducing inaccuracies associated with mounting fixtures on a materials fabrication surface having a movable guide. The materials fabrication apparatus provided by the present invention includes a guide member variably positionable along a slot or track within a materials fabrication surface. The present invention eliminates inaccuracies associated with the guide member-to-slot interface. Alignment error of the guide member is eliminated by providing a positioning element comprised of shapeable material and coupled to the guide member such that, upon adjusting the positioning element, the distance between the guide member and the slot is reduced thereby decreasing side-play and providing a precision guide positioning apparatus.

Figure 1:
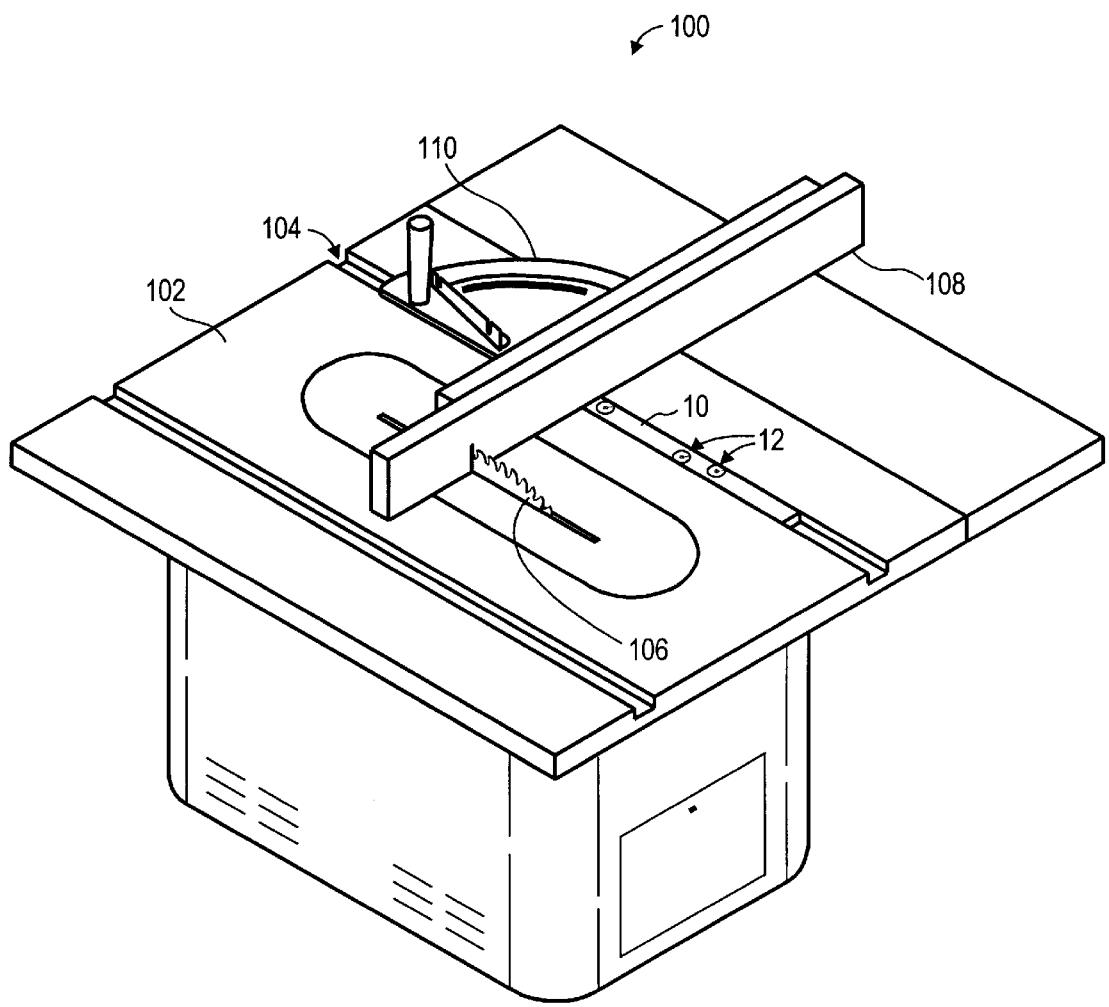
FIG. 1 illustrates the installation of a preferred embodiment of the present invention on a conventional table saw.

FIG. 1 presents an illustration of the present invention installed on a conventional table saw. Table saw 100 includes working surface 102 with slot 104 disposed within working surface 102. Working surface 102 is configured to support a workpiece during cutting operations. In the preferred embodiment of the invention, a positionable guide 10 is slidably disposed within slot 104. Table saw 100 further includes a rotating saw blade 106 having a cutting axis substantially parallel to a longitudinal axis of slot 104.

During materials fabrication operations, the workpiece will be positioned relative to the saw blade 106 or other cutting tool by being placed in abutting relationship with a face of a workpiece positioning member such as the fence 108 of FIG. 1. In the preferred embodiment, the fence 108 may be connected to the positionable guide 10 directly or through an intermediate structure such as the miter gauge 110 in FIG. 1. In FIG. 1, the fence 108 is removably connected to miter gauge 110, which, in turn, is connected to positionable guide 10. When so configured, the combination of positionable guide 10, miter gauge 110, and fence 108 are slidable along the longitudinal axis of slot 104 to move the workpiece (not shown) relative to saw blade 106.

To be functional, positionable guide 10 must be freely slidable within slot 104. As discussed in greater detail below in connection with the preferred embodiment of the invention, positionable guide 10 includes positioning elements 12 that are adjustable to vary the maximum width of positionable guide 10 to correspond to the width of slot 104, thereby reducing tracking errors associated with conventional guide bars.

Those of ordinary skill in the art will readily understand the operation of miter gauge 110 and fence 108 when installed on table saw 100. Thus, the details of the miter gauge's operation need not be included.

While FIG. 1 depicts the operation of positionable guide 10 as installed on a conventional table saw, those skilled in the art will appreciate that the current invention is applicable to any materials fabrication tool having slots disposed within a working surface. For example, the current invention may be used in connection with band saws, router tables, drill presses, and the like.

Figure 2A:
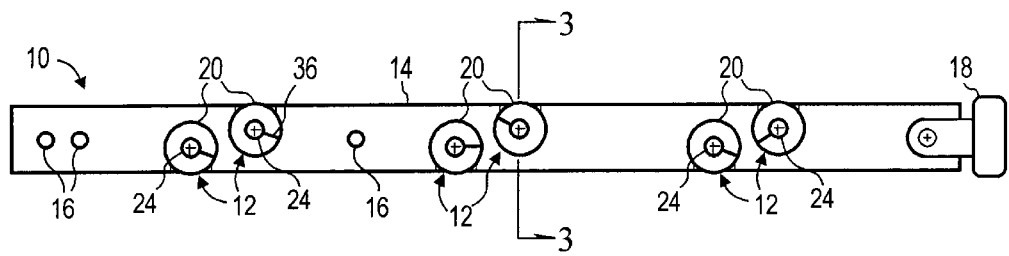
FIG. 2A is a top view of a positionable guide according to a preferred embodiment of the present invention.
Figure 2B:
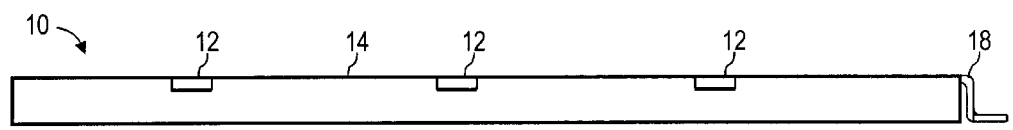
FIG. 2B is a side view of a positionable guide according to a preferred embodiment of the present invention.

Referring now to FIGS. 2A and 2B, an illustration of the positionable guide 10 according to a preferred embodiment of the present invention is shown. Positionable guide 10 includes an elongated body 14 extending a predetermined length and configured to be deposed in a slot within a working surface associated with a materials fabrication tool. Preferably, elongated body 14 is made of steel, although it could be manufactured from any rigid material, and includes a plurality of threaded holes 16 placed at predetermined distances for mounting materials fabrication fixtures, such as a miter gauge, to the top surface of positionable guide 10. As will be readily appreciated by those of ordinary skill in the art, in one embodiment of the invention, positionable guide 10 includes retaining clip 18 removably mounted to elongated body 14 for slidably securing positioning guide 10 when placed in a retaining slot of a materials fabrication surface.

Unlike conventional guide configurations in which the retaining clip is located in a recess on the bottom surface of the guide member, retaining clip 18 is preferably mounted within a recess on the top surface of elongated body 14, and a portion of retaining clip 18 extends in a downward direction towards the bottom surface of positioning guide 10. One skilled in the art can readily appreciate the advantage of a top-mounted, rather than a bottom-mounted retaining clip. By locating retaining clip 18 on the top surface, all machining operations can be performed on the top surface only, thus requiring only one machining setup operation and thus reducing fabrication costs. Conventional guide configurations in which the retaining clip is located in a recess on the bottom surface of the guide member may require an additional machining operation in which the guide member must be turned over to machine the recess on the bottom surface. This bottom surface machining operation is additional to any machining operations that may be required on the top surface and thus, increases fabrication costs.

Referring again to FIGS. 2A and 2B, positioning guide 10 further includes adjustable positioning elements 12 coupled to elongated body 14 for varying the maximum width of positioning guide 10. As will be shown below, the ability to vary the maximum width of positioning guide 10 enables the operator to obtain a tight sliding fit of positioning guide 10 within a slot in a working surface associated with a power tool. Such a tight fit while maintaining a highly slidable interface between the positioning guide 10 and the slot facilitates ease of use with great reduction in tracking errors commonly associated with loose-fitting guides.

In the preferred embodiment, positioning elements 12 are disposed in recesses within the top portion of elongated body 14. Preferably, positioning elements 12 include split-washers 20 made of a resilient but durable material, such as nylon, spring steel or the like, that are split at a location 36 to allow the split-washers to expand and contract in response to pressure applied at an inner surface of split-washer 20. In the preferred embodiment, adjustment mechanism 24 includes a threaded screw centered in split-washer 20 and mounted to a portion of elongated body 14.

Figure 3:
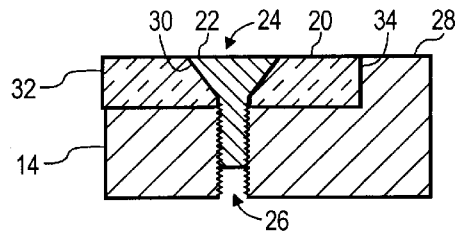
FIG. 3 is a cross-sectional view of a positioning element forming part of the positionable guide according to a preferred embodiment of the present invention.

FIG. 3 shows a cross-sectional view of a positioning element 12 taken at Section 3—3 of FIG. 2A. In the preferred embodiment, adjustment mechanism 24 includes threaded screw 22 threaded into hole 26 disposed within elongated bar 14. Locally adjacent to positioning elements 12, elongated body 14 includes shoulder portions 28, which retain split-washer 20, as shoulder portion 28 is maintained in abutting relationship with unexposed edge 34 of split-washer 20. The inner surface of split-washer 20 is preferably configured to correspond to a tapered head of threaded screw 22 to form tapered interface 30.

In the preferred embodiment as shown in FIG. 3, when threaded screw 22 is tightened, split-washer 20 expands because of the tapered interface 30 between threaded screw 22 and split-washer 20. Because unexposed edge 34 is inhibited from movement by shoulder portion 28, exposed edge 32 of split-washer 20 moves outwardly perpendicular relative to the longitudinal axis of positioning guide 10 as threaded screw 22 is tightened. Similarly, exposed edge 32 of split-washer 20 moves inwardly perpendicular relative to the longitudinal axis of positioning guide 10 as threaded screw 22 is loosened. Through this process, the overall width of positioning guide 10 is varied through the adjustment of positioning elements 12.

Of course, the invention is not limited to the preferred embodiment including the split-washer described above. For example, shapeable materials other than a nylon or metal split-washer can be coupled to the guide apparatus and expanded in an outwardly direction using any expansion mechanism, such as a spring loaded lever. Likewise, those of ordinary skill in the art will recognize that any mechanism incorporating a tapered interface between a laterally movable element and an adjustment element connected to an elongated member adapted to be disposed within a slot associated with a power tool would be equivalent to the preferred embodiment described herein.

Figure 4:
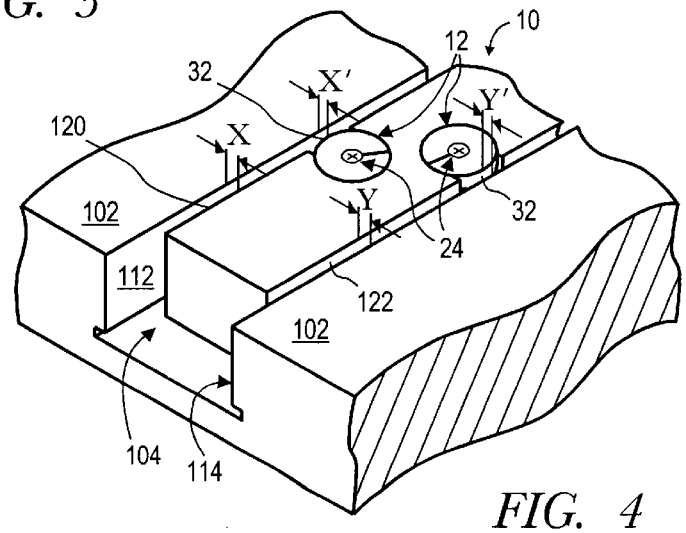
FIG. 4 illustrates the operational details of the positioning element according to a preferred embodiment of the present invention.

Referring now to FIG. 4, a detail of positioning guide 10 disposed within slot 104 is shown. Naturally, to be slidable within slot 104, the width of elongated body 14 must be less than the width of slot 104. In FIG. 4, the dimension X is given to the distance between one side 120 of elongated body 14 and side wall 112 of slot 104. It will be readily understood that there will similarly be a distance, dimension Y, between the opposite side 122 of elongated body 14 and the opposite side wall 114 of slot 104, and that distance will not necessarily be the same as the distance X. At the longitudinal location of positioning elements 12 there is a distance X' or Y' between exposed edge 32 and side wall 112 or 114. When adjustment mechanism 24 is tightened, as described for the preferred embodiment above, exposed edge 32 moves outwardly relative to the longitudinal axis of positioning guide 10, thereby reducing X' or Y'. Similarly, when adjustment mechanism 24 is untightened, exposed edge 32 moves inwardly relative to the longitudinal axis of positioning guide 10, thereby increasing X' or Y'.

In practice, positioning elements 12 will be adjusted such that exposed edges 32 come into contact with the corresponding side walls 112 and 114 of slot 104, such that the distances X' and Y' are reduced to zero. In this manner, the tracking errors associated with the positioning guide-to-slot interface are eliminated. The adjustable nature of the positioning guide 10 allows it to be used with a variety of slots having different slot widths thereby providing a precise guide positioning apparatus for various materials fabrication surface configurations.

In the preferred embodiment shown in FIGS. 2A, 2B, and 4, a plurality of positioning elements 12 are dispersed linearly along the length of both sides 120 and 122 of elongated body 14 to provide multiple, independent adjustment contact points between exposed edges 32 of positioning elements 12 and sidewalls 112 and 114 of slot 104. This arrangement allows both sides of positioning guide 10 to be independently adjusted to conform exactly to sidewalls 112 and 114. Because tracking accuracy is dependent solely upon the proper adjustment of exposed edges 32 relative to sidewalls 112 and 114, it will be understood by those skilled in the art that small-to-moderate dimensional imperfections in either the width or straightness of elongated body 14 will not affect the operator's ability to achieve error-free alignment between positioning guide 10 and slot 104. Elongated body 14 can thus normally be constructed from inexpensive, low tolerance stock materials, and the need for costly secondary machining operations to improve tolerances on the stock material can thereby be avoided.

It will be understood by those skilled in the art that the embodiments set forth hereinbefore are merely exemplary of the numerous arrangements for which the invention may be practiced, and as such may be replaced by equivalents without departing from the invention which will now be defined by appended claims.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A guide usable with a working surface having a slot with two side walls for receiving said guide therebetween, said guide comprising:

an elongated body having two elongated surfaces and two side surfaces, said elongated body being positionable within said slot;

at least one positioning element including a washer of resilient material, wherein said positioning element is coupled to at least one of said two elongated surfaces of said elongated member, said positioning element having a lateral surface in facing relationship with one of said side walls when said elongated body is positioned within said slot, defining a gap between said lateral surface and said side wall; and means operably coupled to said elongated body for varying the position of said lateral surface relative to a longitudinal axis of said elongated body, said means for varying the position of said lateral surface including a screw threaded into said elongated body, said screw configured to be adjusted to alter the shape of said washer, whereby the dimensions of said gap are varied.

2. The guide as recited in claim 1, wherein said washer includes an upper washer surface, a lower washer surface, an outer annular edge, and an inner annular edge, said inner annular edge being tapered inwardly from said upper surface to said lower surface.

3. The guide as recited in claim 2, wherein said screw includes a tapered screw head.

4. The guide as recited in claim 3, wherein a portion of said tapered screw head is in facing relationship with said inner annular edge.

5. The guide as recited in claim 1, wherein said elongated body includes a recess in at least one of said elongated surfaces for receiving said positioning element.

6. The guide as recited in claim 1, wherein said two elongated surfaces include an upper elongated surface and a lower elongated surface when said elongated body is disposed within said slot, and wherein said means for varying the position of said lateral surface is accessible from above said upper elongated surface of said elongated body.

7. The guide as recited in claim 1 further comprising a retaining clip coupled to one end of said elongated body.

8. The guide as recited in claim 1, wherein said elongated body is made of a rigid material.

9. The guide as recited in claim 1 further comprising mounting holes for mounting a fixture.

10. The guide as recited in claim 9, wherein said fixture is a miter gauge.

* * * * *